Figure 4:
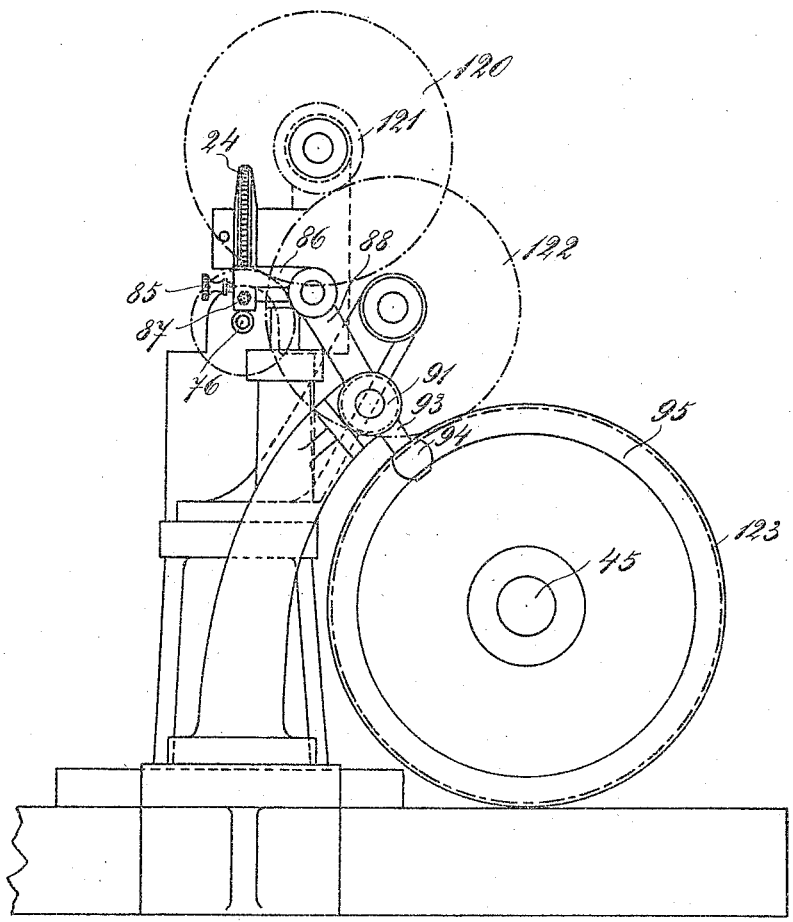

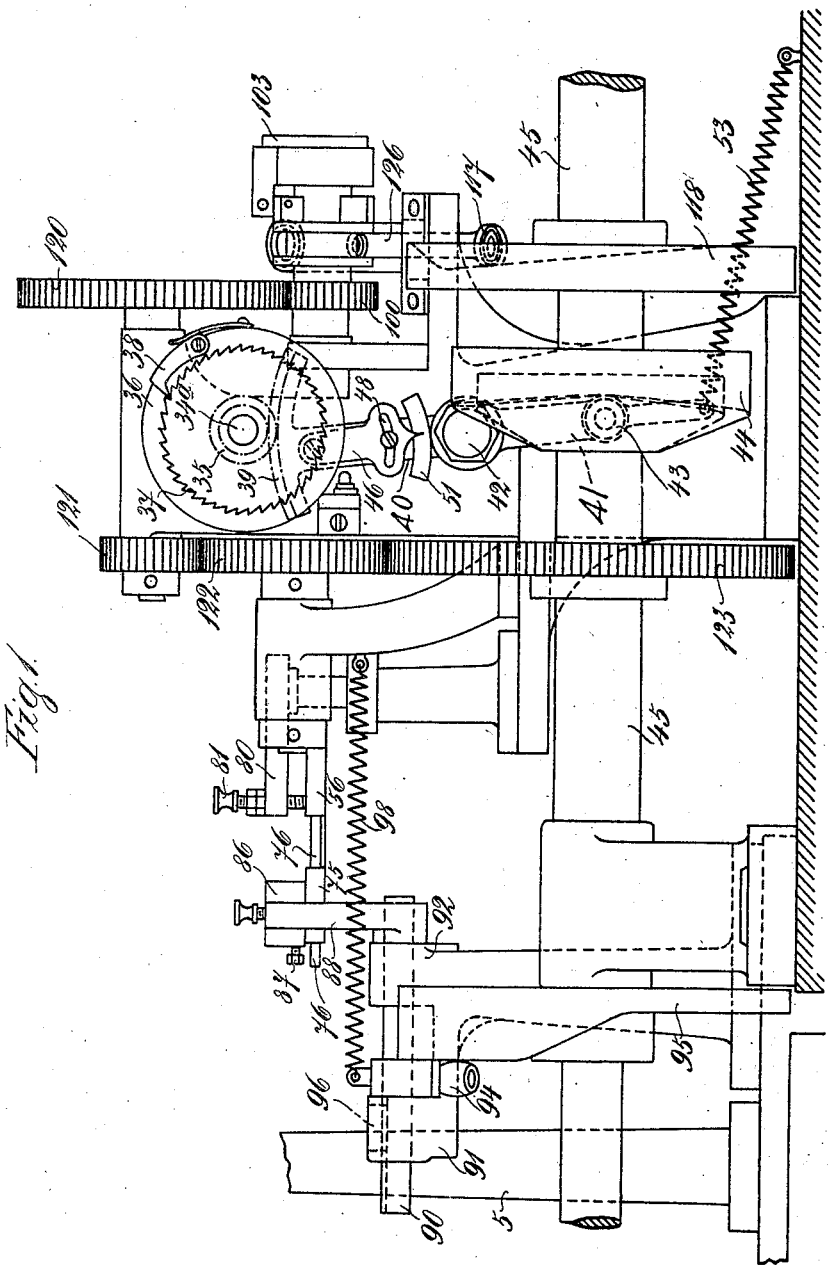

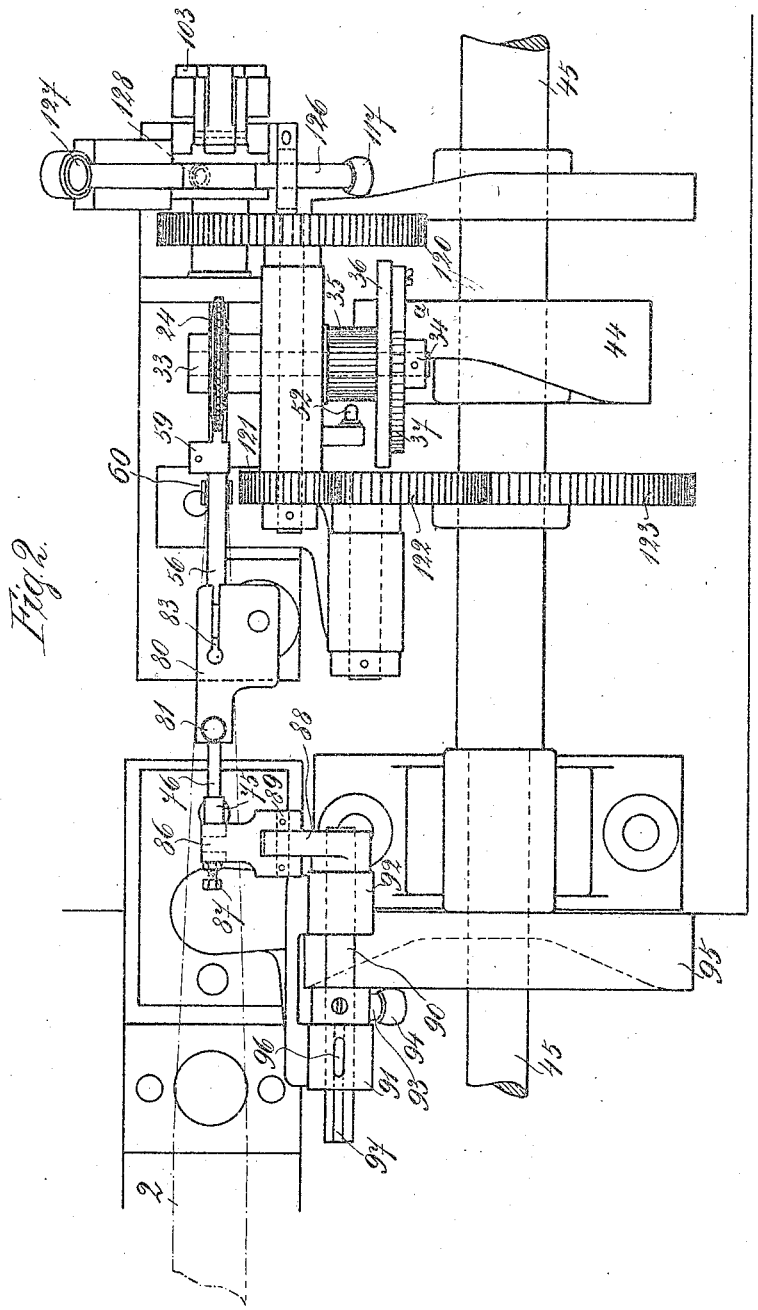

A. ABEL.
MACHINE FOR MANUFACTURING PAPER TUBES.
APPLICATION FILED MAR. 12, 1906.
929,180.
Patented July 27, 1909.
6 SHEETS—SHEET 3.
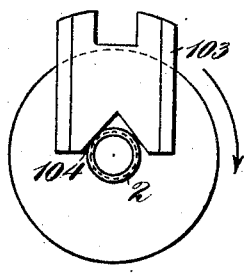
Fig. 10.
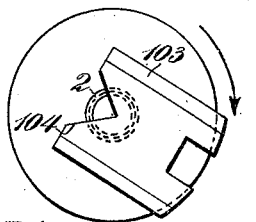
Fig. 10ᵃ.
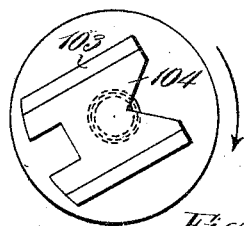
Fig. 10ᵇ.
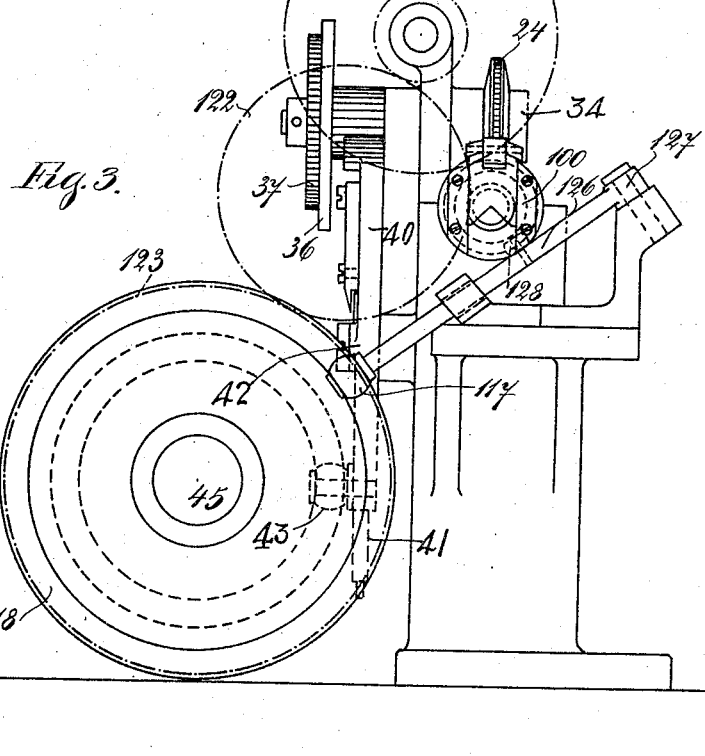
Fig. 3.
Fig. 11ᵃ.
Fig. 11.
Fig. 12.
Witnesses
Carl Ruß
Arthur Scholz
Inventor:
August Abel.
by Rauchfuss
Attorney.

A. ABEL.
MACHINE FOR MANUFACTURING PAPER TUBES.
APPLICATION FILED MAR. 12, 1906.

929,180.

Patented July 27, 1909.
6 SHEETS—SHEET 4.

Witnesses:
Carl Reys.
Arthur Scholz.

Inventor:
August Abel.
by Paters Duppler
Attorney.

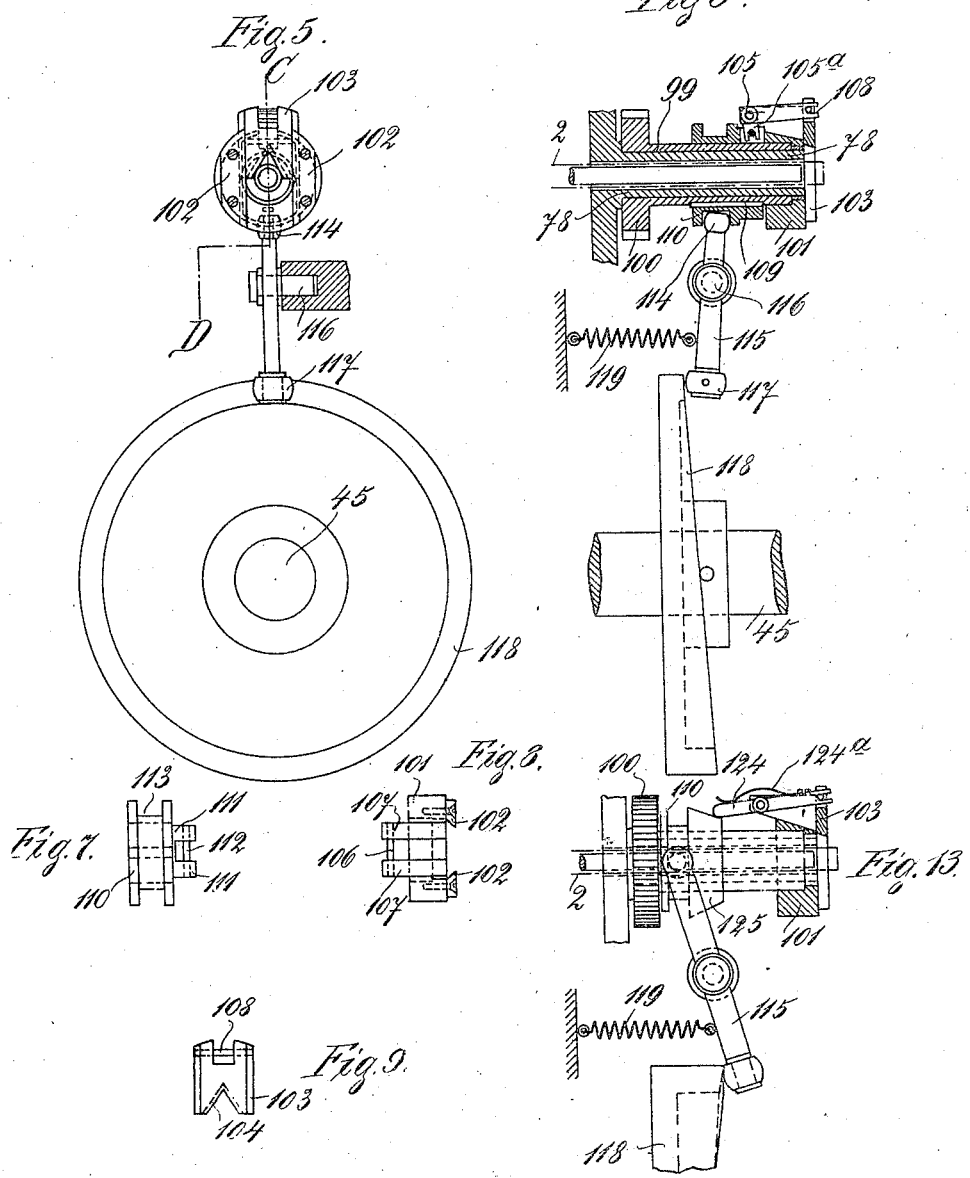

A. ABEL.
MACHINE FOR MANUFACTURING PAPER TUBES.
APPLICATION FILED MAR. 12, 1906.
929,180.
Patented July 27, 1909.
6 SHEETS—SHEET 6.
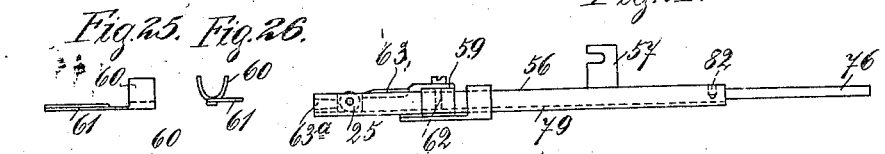
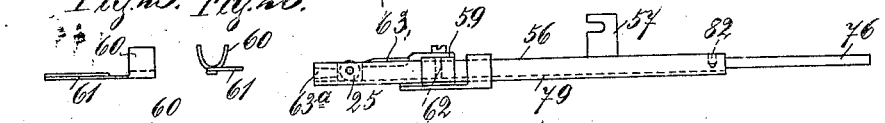
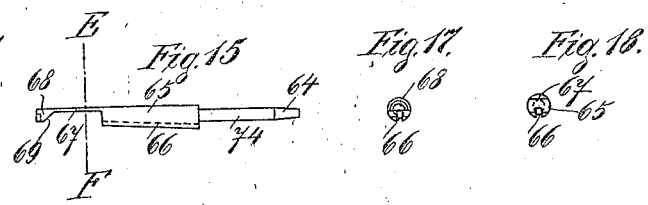
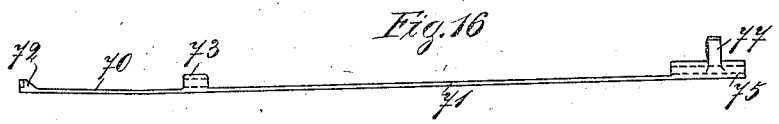
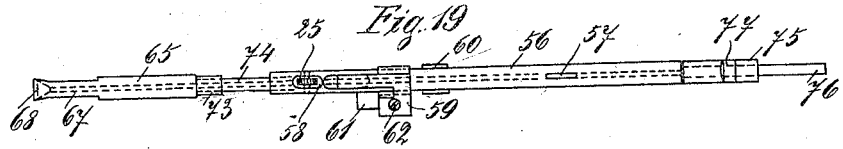
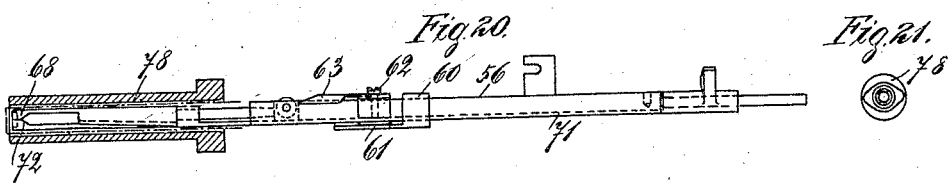
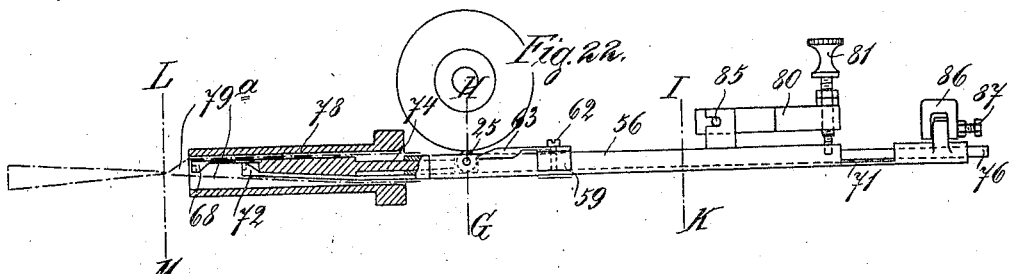
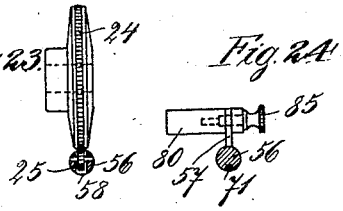
Witnesses:
Carl Ruff
Arthur Scholz
Inventor:
August Abel
by (attorney signature)
Attorney

UNITED STATES PATENT OFFICE.

AUGUST ABEL, OF BADEN, GERMANY.

MACHINE FOR MANUFACTURING PAPER TUBES.

No. 929,180.  Specification of Letters Patent.  Patented July 27, 1909.

Application filed March 12, 1906. Serial No. 305,643.

*To all whom it may concern:*

Be it known that I, AUGUST ABEL, a subject of the Grand Duke of Baden, and resident of Baden, in the Grand Duchy of Baden, German Empire, chief engineer, have invented certain new and useful Improvements in Machines for Manufacturing Paper Tubes, of which the following is an exact specification.

The present invention relates to machines for manufacturing paper tubes for cigarettes and the like from flat paper strips. In such machines the paper strip is led from a reel or bobbin intermittently in suitable lengths. These lengths are folded and joined by pasting or by crimping—according to the machine herein described by crimping—and the lengths are cut off. After this one end of the paper tube so formed is closed or tucked in by a tucker.

The present invention has particular reference to the folding means and the delivery of the folded paper tube to the cutting device. It also however deals with the means used for tucking in the edges of the cut off paper tube length at one end.

The improved construction will be more readily understood from the following detailed description and the novel features of the invention will be set forth in the claims.

In the drawings Figure 1 is a partial side view of a paper tube making machine in accordance with this invention, Fig. 2 is a plan and Fig. 3 is a view looking from the right-hand in Fig. 1, while Fig. 4 is a view looking from the lefthand in same figure. The details of the invention are illustrated in the remaining figures, in which: Fig. 5 is a front view of the tucking in device for closing one end of the paper tube, Fig. 6 is a side view partially in section on the line C—D of Fig. 5, Fig. 7 is a detail of the tucker and its slide looking from the rear side, Fig. 8 is a view looking from the end of the slide, while Fig. 9 is a separate view of the tucker. Figs. 10, 10a and 10b illustrate the tucker in different positions, Fig. 11 shows the cut off length of paper tube, Fig. 11a is an end view showing the paper edges folded into one another prior to the crimping. Fig. 12 is an end view of the paper tube after the end has been tucked in or closed. Fig. 13 illustrates a modified form of device for operating the tucker plate. Figs. 14 to 27 illustrate the folding spindle together with the folding sleeve and edge folding knife. Fig. 15 is a separate view of the extension piece of the folding spindle. Fig. 16 is a separate view of the movable expander, which enables the cutting to be effected while the tube is flattened. Fig. 17 is a view from the lefthand and Fig. 18 is a section on the line E F of Fig. 15. Fig. 19 is a view showing the parts of the folding spindle assembled in plan, while Fig. 20 is a side view showing the receiving sleeve in section. Fig. 21 is an end view looking from the lefthand side in Fig. 20. Fig. 22 is a view similar to Fig. 20 showing the parts in a different position and also illustrating the method of suspending the spindle. Fig. 23 is a vertical section on the line G—H of Fig. 22, the crimping wheels are not shown in section. Fig. 24 is a section on the line I—K of Fig. 22. Fig. 25 is a separate side view, Fig. 26 an end view, and Fig. 27 another side view of the preliminary folder which gives the paper strip the first bend before it is entered into the folding sleeve proper.

In the figures similar parts are designated by similar reference characters.

Referring to Figs. 1-4 the paper strip 2 fed from a bobbin or reel not shown passes over the folding spindle to the preliminary bender 60 which will be hereinafter more fully described and then to the sleeve 59. This sleeve has coacting with it a folding knife 63 (see Fig. 20) which in the known manner bends over the edges of the paper strip so that they engage in one another in the manner seen in Fig. 11a. The tube so bent then passes over the folding spindle 56 to the crimping wheels 24 and 25 where the edges are crimped in the well known manner and as indicated in Fig. 11. The crimping wheel 24 is driven intermittently in the manner hereinafter described so that only the required length of paper strip is fed forward at one time. The fed forward length of crimped paper tube is then cut by an arrangement not illustrated and forming no part of this invention. The delivery of the crimped paper tube however to the shears is such that the paper tube can be flattended by the shears and a much cleaner edge is thereby secured. After cutting the paper tube passes to the tucking in device 102 and 103.

Having indicated generally the organization of this machine I shall now proceed to details.

In Figs. 14 to 27 the folding spindle is illustrated and is built up of different parts. It may be here stated that the number of parts can be modified according to the special circumstances of the work.

In Figs. 14 to 16, 56 is the main spindle part suspended from the standard of the machine by means of the hanger 57 as hereinafter described. 25 is a small knurled wheel situated in a slot 58 of the spindle 56 and coöperating with the knurled wheel 24 which as stated above moves intermittently. The knurled crimping wheel 24 is fixed on the short axle 33 (see Figs. 1 and 2) carried by the standard 34 of the machine (Fig. 3). On the part 34ª of the axle 33, there is loosely mounted the toothed wheel 35 to which the disk 36 is secured. 37 is a ratchet wheel fixed to the part 34ª and coöperating with a pawl 38 pivotally connected with the disk 36. The toothed wheel 35 engages with the segmental toothed bar 39 carried by a double lever 40, 41, having its fulcrum at 42. The arm 41 is provided with a roller 43 resting on a curved disk 44 mounted on the main driving shaft 45. A spring 53 tends to hold the roller 43 continuously in contact with the curved disk 44. An adjustable stop 52 determines the extent to which the spring 53 can cause the lever to follow the cam or curved disk 44 and a pointer 48 moving over a scale 51 indicates the amount of the feed. This feeding device and the method of regulating the amount of feed forms no part of the present invention and need not be further explained. 59 is a sleeve loosely embracing the main spindle part 56 and acting as a former for bending the paper strip into tube form around the main spindle part 56. Behind the part 59 the device illustrated in Figs. 25 to 27 is arranged for preliminarily imparting to the flat paper strip a U-form. 60 is a bow embracing the rod 56 and in connection with a bar 61 by means of which the part 60 is fixed to the part 59. The screw 62 projecting through the part 59 serves for effecting this connection. 63 is the folding knife which is situated in a longitudinal depression on the spindle part 56 and is arranged to produce a fold at one edge of the paper strip into which the other edge passes as illustrated in Fig. 11ª. The folding knife 63 is carried by the sleeve 59. The folding knife and its action need not be here further described as the same forms no part of this invention. For crimping the paper tube with its edges arranged as shown in Fig. 11ª the tube passes with the folded edges between the knurled wheels 24 and 25. In front of the knurled wheel 25 the rod 56 is provided with a conical aperture 63ª into which fits a corresponding conical edge 64 on the part 65 which is provided on its under side with a groove 66. The part 65 is continued by the leg 67 as seen in cross section in Fig. 18 and at its front end the leg 67 is shaped into a head 68. As seen in Fig. 15 an inclined face 69 is provided on the under side of this head. The groove 66 is also somewhat inclined to the horizontal. In the groove 66 there is inserted the part 70 of the rod 71 which is provided at its front end with a head 72 similar to the head 68. The head 72 together with the head 68 form a filling core for the interior of the tube. When the rod 71 is withdrawn in the method hereinafter described, the paper tube may however be collapsed toward one end. An eye 73 is provided on the rod 71 and is adapted to slide on the rod 74 (see Fig. 15). At the rear end of the rod 71 there is provided a sleeve 75 which is adapted to slide over the reduced part 76 of the main spindle part 56, (see Figs. 14 and 19). A leg 77 is provided on the sleeve 75 for the purpose hereinafter described.

In Fig. 19 the folding spindle is illustrated as a whole and in the position in which the two heads 72 and 68 of the parts 65 and 71 are opposite each other so that the filling core forms at its front end a cylinder fitting tightly within the finished paper tube.

In Fig. 20 the folding spindle is illustrated as a whole in side view and in combination with a cylindrical sleeve 78 inclosing the front part of the folding spindle. From Fig. 21 it will be seen that the part 78 is internally of substantially oval shape.

In Fig. 22 the folding spindle is illustrated with the parts in another position, that is to say the head 72 (see Fig. 16) is withdrawn from the head 68 and thereby the filling core is contracted. Owing to the inclined part 70 and the oval core the paper tube may be flattened to form a wedge-shaped piece as indicated by the dotted lines 79ª, the narrow end of which wedge lies in the plane L M. In this plane the paper tube is cut off by a cutting device which does not form part of my invention. Owing to this flattening the edges of the paper are neatly cut. After the required length of paper tube is cut from the paper strip the part 71 is displaced in order to bring the head 68 and 72 opposite each other into the position shown in Fig. 20. This manipulation is facilitated by the inclined face 69 of the head 68. In order to obtain good guidance of the rod 71 the latter slides in a corresponding groove 79 in the spindle 56 (see Fig. 14).

In the arrangement for suspending the folding spindle, (see Figs. 23, 24) there is a piece 80 secured to the standard of the machine and 81 is a set screw which is threaded into the opening 82 (see Fig. 14) and mounted on the holding piece 80. This piece is slotted at 83 (see Fig. 2) and in this slot there projects a piece 57 which is provided with a notch for engaging a bolt 85. By turning the set screw 81 the folding spindle may be adjusted as regards its horizontal position. At the rear end of the folding spindle the arrangement is provided for actuating the piece 71 (see Fig. 22). In this device, 86 is a holding piece (see also Fig. 2) which is connected with the projecting arm 77 by means of the screw 87. Opposite to this end the piece 86 is connected with the crank lever 88 by the bolt 89 fixed to the slidable rod 90 carried by the bearings 91, 92 of the standard of the machine. On the rod 90 there is mounted the arm 93 carrying the roller 94 which rests on the cam disk 95. The latter is situated in the driving shaft 45 and rotated thereby, (see Figs. 1 and 2). In order to prevent rotation of the rod 90 the feather 96 projects into a groove or feather seat 97. The arm 93 is connected with a spring 98 secured to the standard of the machine. The device just described operates the rod 71 of the folding spindle and it will be seen therefrom that by the revolution of the curved disk 95 the rod 90 is moved to and fro which motion is transferred by the cranked lever 88 and the holding piece 86 to the projection 77 of the piece 71. The curved disk 95 is arranged in such a manner that the part 71 is withdrawn when the required length of paper tube is being cut from the paper strip and is advanced when the paper tube is to be closed or tucked in at its front end.

The operation of the folding spindle is as follows: The knurled wheels 24 and 25 operated as described serve for feeding intermittently the paper strips 2 and for crimping the edges of the tube in the well-known manner. The bow 60 converts the flat paper strip into a partially circular or U-form and the sleeve 59 imparts to the strip the complete tube-shape. The knife 63 folds one edge of the strip, as seen in Fig. 11ª, in the manner well known. After being crimped by the knurled wheel and still in connection with the paper strip, the paper tube is fed forward by the knurled wheels and conducted through the guide sleeve 78. When passing the latter the rod 71 is in its withdrawn position and the heads 68 and 72 are disengaged (see Fig. 22). The paper tube may therefore easily be pressed flat by the shears which are not illustrated, and which operate at the point indicated by the line L M and thereby a smooth and straight cut is obtained. After this the part 79ª of the paper tube is to be transformed or widened into cylindrical shape and for this purpose the rod 71 is moved forward by the crank lever 88 and the cam disk 98 so as to cause the heads 68 and 72 to spread the flattened tube into circular form. This tube is now to be closed or tucked in. The tucker is illustrated in Figs. 5-12 in which 78 denotes a stationary hollow shaft as mentioned above with reference to Figs. 20 and 22, and inclosing the front end of the folding spindle. 99 is a hollow shaft rotatably mounted on the part 78 and having cast or formed therewith a toothed wheel 100 at one end. At the other end the closing head 101 is fixed on the shaft 99, as seen in Figs. 6 and 8. The front side of this head is provided with two guides 102 for guiding the closing or tucking plate 103. This tucking plate has a notch 104, widening toward the folding spindle and is adapted to move simultaneously transversely to the spindle and to revolve about the spindle in the manner hitherto known. For the purpose of moving the tucker plate 103 transversely to the folding spindle a knee lever 105 and 105ª is provided hinged at 106 to the arms 107 of the head 101. The arm 105 engages by means of the pin 108 with the plate 103. On the hollow shaft 99 there is mounted a sleeve 110 which is prevented from rotation by a key 109 and which carries on its arms 111 the pin 112. This pin engages with the fork-shaped end of the arm 105ª. In the groove 113 (see Fig. 7) the roller 114 engages and is carried by a lever 115 pivoted about the axle 116 and provided at its lower end with a roller 117 traveling on the cam disk 118. This cam disk is mounted on the driving shaft 45. The spring 119 tends to hold the lever 115 continuously in contact with the cam disk 118. This device operates as follows:—The hollow shaft 99 is rotated by the toothed wheel 120, as seen from Figs. 1 to 3. This toothed wheel is operated by means of the wheels 121, 122 and 123 which last is mounted on the driving shaft 45. At the same time the lever 115 is oscillated under the action of the cam disk 118 and the sleeve 110 is thereby reciprocated on the hollow shaft 99. By virtue of this motion the knee lever 105 and 105ª which engages with the sleeve 110 imparts to the plate 103 a motion transverse to the folding spindle as seen in different positions in Figs. 10, 10ª, 10ᵇ. At the same time the plate 103 rotates so that the notch 104 describes a spiral shaped path. The frone end of the tube, that is the paper tube, as can be seen in Figs. 11 and 11ª, projects somewhat beyond the face of the plate 103 and by virtue of the motion of the tucking plate as above indicated, the end of the paper tube is tucked in, as illustrated in front view in Fig. 12.

In Fig. 13 there is illustrated a modification of the tucking device according to which a straight lever 124 is used instead of a knee lever, this straight lever being arranged to carry the tucking plate 103. The righthand end of the lever 124 is connected to the plate 103 while the other end is pressed by the spring 124ª onto the truncated cone 125 mounted on the sleeve 110. The operation of this device will be self evident from the description given above with reference to Figs. 5 and 6.

In Figs. 1, 2 and 3 a further slight modification is illustrated in the tucker operating device. In these figures a one-armed lever 126 is pivoted to the machine standard at the pivot 127, the other end of the lever 126 is provided with a roller 117 which travels on the cam disk 118. On the lever 126 there is arranged a roller 128 engaging with the sleeve 110 of the tucking in device so that by the oscillatory motion of the lever 126 the sleeve 110 is moved transversely to the spindle in the manner above set forth.

I claim:—

1. In combination with intermittent feeding mechanism for a paper strip, mechanism for folding said strip into tube form comprising a main spindle part (56), a semicircular preliminary former attached to and partly surrounding said main part, a sleeve former for completely forming said paper tube, a housing into which the tube passes, a filling core composed of relatively moving parts in said housing and working within the paper tube, and means for expanding and contracting said filling core, for the purpose set forth.

2. In combination with intermittent feeding mechanism for a paper strip, mechanism for folding said strip into tube form, comprising a main spindle part having formers associated therewith for bending said strip into tube-form, means for uniting the adjacent edges of said bent tube, an adjustable filling core over which said tube with its united ends passes, and means for expanding and contracting said core and means for tucking in the edges of the tube after expansion of same by the filling core, as set forth.

3. In a machine for making paper tubes from a paper strip in combination, two knurled wheels for feeding the paper strip intermittently and uniting the longitudinal edges of the strip, means for rotating one of said wheels, a folding spindle comprising a main spindle part (56) mounted on the machine and carrying the other knurled wheel, a semi-circular piece attached to the main spindle part and a folding knife carried by said main spindle part before said semicircular piece, a rod provided with a head and movably carried by the said main spindle part, a further head carrying part attached to the front of the main spindle part, the head on said part being arranged to coöperate with the head on the movable rod, substantially as described.

4. In a machine for making paper tubes from a paper strip, in combination, two intermittently movable knurled wheels for feeding the paper strip and uniting the edges of the same, a folding spindle comprising a stationary main spindle part suspended from the machine frame and formers thereon for bending and shaping the strip into tube form, an extension piece fixed on said main spindle part and having a semicircular head thereon, a rod slidably mounted on said main shaft and provided with a semicircular head coöperating with the first mentioned head to form a filling core for the paper tube, and means for reciprocating said rod, substantially as set forth.

5. The herein described folding spindle for making paper tubes from a paper strip, comprising, a main body part (56) adjustably mounted on the machine frame, a front extension part attached to the end of said main body part, a reciprocating rod (70, 71) provided with eyes engaging the main body part (65) and the front extension part, a bow former associated with said main body part and a knife arranged in front of the bow and attached to said body part (56) substantially as described.

6. The herein described device for tucking in one end of a paper tube comprising a tucking plate (103) having a notch therein and adapted to rotate and reciprocate simultaneously, a head guiding said plate a toothed shaft to which said guiding head is fixed, a sleeve slidably mounted on said toothed shaft (100) and arranged to rotate therewith, a lever engaging with said sleeve and the tucking plate (103) for reciprocating the latter, and means for sliding the sleeve on the toothed shaft, substantially as set forth.

In witness whereof I have hereunto set my hand in the presence of two witnesses.

AUGUST ABEL.

Witnesses:
STEPEN KUNTZ,
BENJAMIN F. LIEFELD.